(12) United States Patent  
Yarden et al.

(10) Patent No.: US 8,185,341 B2
(45) Date of Patent: May 22, 2012

(54) SURFACE TEMPERATURE PROFILE

(75) Inventors: Moshe Yarden, Mevasseret Zion (IL); Marina Rogachevsky, Jerusalem (IL)

(73) Assignee: Medisim Ltd., Neve Illan (IL)

( * ) Notice: Subject to any disclaimer, the term of this patent is extended or adjusted under 35 U.S.C. 154(b) by 716 days.

(21) Appl. No.: 12/130,238

(22) Filed: May 30, 2008

(65) Prior Publication Data

US 2009/0299682 A1  Dec. 3, 2009

(51) Int. Cl.
*G01K 13/00* (2006.01)
(52) U.S. Cl. .................................. 702/128
(58) Field of Classification Search ............. 702/131
See application file for complete search history.

(56) References Cited

U.S. PATENT DOCUMENTS

| | | |
|---|---|---|
| 4,183,248 A | 1/1980 | West |
| 4,411,266 A | 10/1983 | Cosman |
| 4,563,098 A | 1/1986 | Bartran |
| 4,955,380 A | 9/1990 | Edell |
| 5,057,106 A | 10/1991 | Kasevich et al. |
| 5,255,979 A | 10/1993 | Ferrari |
| 5,323,650 A | 6/1994 | Fullen et al. |
| 5,573,004 A | 11/1996 | Groenke |
| 5,879,082 A | 3/1999 | Smitherman et al. |
| 5,957,961 A | 9/1999 | Maguire et al. |
| 6,090,050 A | 7/2000 | Constantinides |
| 6,146,015 A | 11/2000 | Weiss |
| 6,220,750 B1 | 4/2001 | Palti et al. |
| 6,280,397 B1 | 8/2001 | Yarden et al. |
| 6,292,685 B1 | 9/2001 | Pompei |
| 6,794,990 B2 | 9/2004 | Tseng et al. |
| 6,934,220 B1 | 8/2005 | Cruitt et al. |
| 7,249,883 B2 | 7/2007 | Kuroda et al. |
| 7,625,117 B2 | 12/2009 | Haslett et al. |
| 2002/0150143 A1 | 10/2002 | Tokita et al. |
| 2002/0191675 A1 | 12/2002 | Tokita et al. |
| 2003/0231696 A1 | 12/2003 | Kihira et al. |
| 2005/0043631 A1 | 2/2005 | Fraden |
| 2005/0094705 A1 | 5/2005 | Chi |
| 2005/0197540 A1 | 9/2005 | Liedtke |
| 2005/0276309 A1 | 12/2005 | Koch |
| 2006/0047214 A1 | 3/2006 | Fraden |
| 2006/0122473 A1 | 6/2006 | Kill et al. |

(Continued)

FOREIGN PATENT DOCUMENTS

JP  2002-372464  12/2002

(Continued)

OTHER PUBLICATIONS

EP Patent Application 09166144.7 Search Report dated Feb. 3, 2010.

(Continued)

*Primary Examiner* — Drew A Dunn
*Assistant Examiner* — Stephen Cherry
(74) *Attorney, Agent, or Firm* — Nelson Mullins Riley & Scarborough LLP; Anthony A. Laurentano

(57) ABSTRACT

Thermometric apparatus includes one or more temperature sensors, which are configured to provide respective temperature-dependent readings at two or more locations on a surface in a vicinity of a sub-surface heal source. A processing unit is configured to process the readings from the two or more locations so as to determine a temperature of the sub-surface heat source.

24 Claims, 4 Drawing Sheets

U.S. PATENT DOCUMENTS

| | | |
|---|---|---|
| 2007/0027403 A1 | 2/2007 | Kosted |
| 2007/0038141 A1 | 2/2007 | Koch |
| 2007/0194913 A1 | 8/2007 | Yokoshima et al. |

FOREIGN PATENT DOCUMENTS

| | | |
|---|---|---|
| JP | 2003-75262 | 3/2003 |
| WO | 2008/068665 A1 | 6/2008 |

OTHER PUBLICATIONS

Akada, Takashi et al., "The Usefulness of Deep Forehead Temperature as a Guide of Body Core Temperature," *Anesthesia*, vol. 52(10):1066-1073 (2003).

Fulbrook, Paul, "Core body temperature measurement: a comparison of axilla, tympanic membrane and pulmonary artery blood temperature," *Intensive and Critical Care Nursing*, vol. 13:266-272 (1997).

SURFACE TEMPERATURE PROFILE

FIELD OF THE INVENTION

The present invention relates generally to non-invasive measurement of sub-surface heat source temperature, and specifically to methods and systems for non-invasive core body temperature measurement.

BACKGROUND OF THE INVENTION

The measurement of an internal body temperature is useful for assessing the health of a subject. Body temperature is typically measured by a thermometer positioned in a human body cavity, such as the mouth, the axilla, or the rectum, or at an external site, such as the subject's forehead or temple. Invasive and non-invasive methods are also known for measuring core body temperatures in major organs of the body. Core body temperature is generally considered a better indicator of a subject's health than peripheral temperatures measured in body cavities or at external sites.

U.S. Pat. No. 6,280,397 ('397) to Yarden et al., whose disclosure is incorporated herein by reference, provides a device for estimating a core body temperature using an invasive temperature probe. The probe of '397 comprises first and second temperature sensors separated by thermal insulation thereby providing a means for measuring heat flux.

U.S. Pat. No. 6,292,685 to Pompei, whose disclosure is incorporated herein by reference, provides a method of detecting body temperature by laterally scanning an infra-red (IR) temperature detector across a forehead and providing a peak temperature from an area corresponding to a location of a temporal artery.

U.S. Pat. No. 6,794,990 to Tseng, whose disclosure is incorporated herein by reference, provides an electronic patch thermometer that communicates by wireless means to a receiver. The receiver generates a magnetic field transmission to provide power to the electronic patch thermometer.

U.S. Patent Publication 2006/0122473 to Kill et al., whose disclosure is incorporated herein by reference, provides an electronic thermometer that transmits a temperature signal to a receiver that in turn converts the signal to a format compatible with a monitor.

U.S. Patent Publication 2007/0194913 to Yokoshima et al., whose disclosure is incorporated herein by reference, provides a wireless temperature sensor module designed to be sealed within a container the size of a coin and to communicate temperature and patient information to a base station.

U.S. Pat. No. 6,220,750 to Palti, whose disclosure is incorporated herein by reference, discloses a method of measuring core body temperature by establishing a steady state of heat flow radiated from the surface of the body. External body temperatures are monitored at two points within an insulated space, one closer to the surface of the body and the second more distant from the surface of the body. The two points in the space are lined up perpendicular to the body surface. Energy is applied to heat the space, so as to increase the speed of reaching a steady state of heat flow from the body. When the steady state is achieved, the temperature at both of the points is equal and this temperature is assumed to equal the core body temperature.

U.S. Pat. No. 7,249,883 to Kuroda et al., whose disclosure is incorporated herein by reference, discloses a method for measuring a core body temperature from temperature measurements made by two external heat flux sensors. The external heat flux sensors are configured to have different heat flow resistivities. Varying resistivities may be obtained by several methods, including varying the thickness of insulation between the pairs of temperature sensors in each heat flux sensor.

Correlations between external and peripheral temperatures with the core body temperature are described by Fullbrook in "Core temperature measurement: a comparison of axilla, tympanic membrane and pulmonary artery blood temperature," Intensive Critical Care Nursing, October 1997, 13(5): 266-72, whose disclosure is incorporated herein by reference.

SUMMARY OF THE INVENTION

Embodiments of the present invention provide apparatus and methods for estimating a core body temperature based on a profile of body surface temperatures and/or heat flux profiles in the vicinity of a blood vessel.

In some embodiments, a thermometer compromises one or more temperature sensors, which are configured to measure a temperature profile comprising at least one temperature reading, taken at two or more respective, proximate locations on a body surface in the vicinity of blood vessels, such as the carotid artery. An estimate of a core body temperature is determined based on the profile.

The measurement of the temperature and/or the heat flux profile may be performed in a contact or contactless manner, and may be performed by multiple temperature sensors at stationary positions, or by one or more sensors that are moved manually or by a mechanical means across a body surface.

There is therefore provided, in accordance with an embodiment of the present invention, a thermometric device including:

one or more temperature sensors, which are configured to provide respective temperature-dependent readings at two or more locations on a surface in a vicinity of a sub-surface heat source; and a processing unit configured to process the readings from the two or more locations so as to determine a temperature of the sub-surface heat source.

In some embodiments, the surface is a skin surface of a body of a mammalian subject, and the sub-surface heat source is blood vessel, and the processing unit is configured to determine the temperature of the blood in the vessel. The two or more locations may be arranged along a line that crosses the vessel. In one embodiment, the vessel is a carotid artery, and the one or more temperature sensors are configured to measure the temperature-dependent readings on a neck of the subject.

In a disclosed embodiment, the processing unit is configured to determine from the readings a temperature gradient over the surface and to use the temperature gradient in determining the temperature of the sub-surface heat source. Additionally or alternatively, the processing unit is configured to use a set of heat flux relationships in determining the temperature of the sub-surface heat source. Further additionally or alternatively, the processing unit is configured to determine from the readings a coordinate of maximum temperature on the surface and to use the coordinate in determining the temperature of the sub-surface heat source. The processing unit may be configured to use a distance between the locations in determining the temperature of the sub-surface heat source.

In one embodiment, the apparatus includes a patch, which holds the one or more temperature sensors and is configured to be affixed to a body surface. In another embodiment, the apparatus includes a movement mechanism for moving a sensing area of the one or more temperature sensors between the two or more locations. The apparatus may include a housing, which contains the one or more temperature sensors and is configured to be moved in proximity to the surface between the two or more locations, and a position sensor for tracking movement of the housing.

In a disclosed embodiment, the one or more temperature sensors include infrared sensors, and the apparatus includes at least one lens, for focusing infrared radiation from the surface onto the one or more temperature sensors.

In some embodiments, the one or more temperature sensors include an array of multiple temperature sensors, which are arranged such that each of the temperature sensors is disposed in proximity to a respective one of the locations. The apparatus may include an ambient temperature sensor, which is configured to measure an ambient temperature, and the processing unit may be configured to use the ambient temperature in determining the temperature of the sub-surface heat source.

In one embodiment, the apparatus includes a transmitter configured to transmit a signal indicative of the temperature of the sub-surface heat source to an external monitor. Additionally or alternatively, the apparatus may include a signal converter, which is configured to receive an input signal indicative of the temperature of the sub-surface heat source and to convert the input signal into an output signal having a format complying with an industry monitoring standard.

There is also provided, in accordance with an embodiment of the present invention, a method for thermometric measurement, including:

measuring respective temperature-dependent readings at two or more locations on a surface in a vicinity of a sub-surface heat source; and calculating a temperature of the sub-surface heat source from the temperature-dependent readings at the two or more locations.

The present invention will be more fully understood from the following detailed description of the embodiments thereof, taken together with the drawings in which:

DETAILED DESCRIPTION OF EMBODIMENTS

Figure 1:
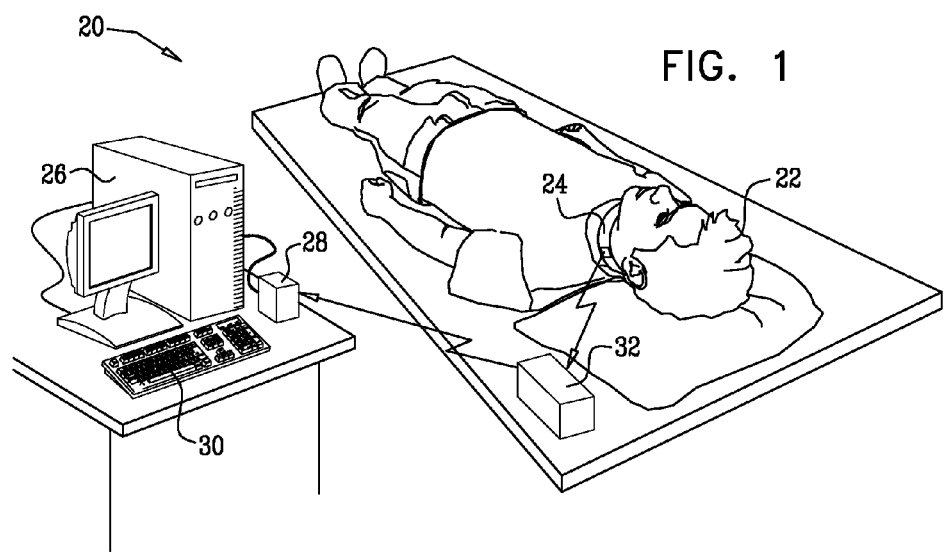
FIG. 1 is a schematic, pictorial illustration of a system for measuring a body temperature with a thermometric device, in accordance with an embodiment of the present invention.

FIG. 1 is a schematic, pictorial illustration of a system 20 in which a core body temperature of a mammalian subject 22 is determined by a thermometric device, such as a temperature sensor module 24, in accordance with an embodiment of the present invention.

Figure 4A:
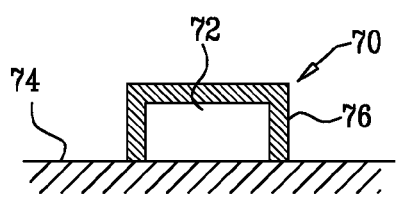
FIGS. 4A-4C are schematic, pictorial illustrations of alternative temperature sensors in a temperature sensor module, in accordance with embodiments of the present invention.
Figure 4B:
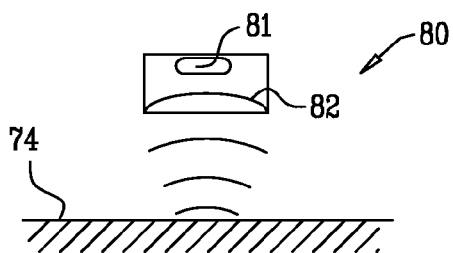
Figure 4C:
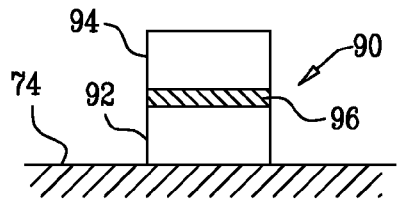

Within the temperature sensor module (described further hereinbelow with respect to FIGS. 2A and 2B) is a temperature sensor array (FIGS. 5A-5C) comprising one or more temperature sensors (FIGS. 4A-4C).

Temperature sensor module 24 is placed against the skin of the subject at a surface measurement site under which a blood vessel is located. A typical site is on the subject's neck at a location directly over the carotid artery. This site is appropriate because medical attendants can usually identify the site of the carotid artery accurately. The temperature sensor module may be affixed at the measurement site as a patch thermometer, as shown in FIG. 1, or may be held against or near the skin as a handheld thermometer (FIG. 6) The temperature sensor module is positioned such that the length of the module traverses the skin at approximately a right angle to the direction of the blood vessel.

When the temperature sensor module is positioned at the measurement site, at least one of the temperature sensors within the temperature sensor module acquire a set of data comprising at least one temperature-dependent measurement at each of two or more body surface locations in proximity to the blood vessel. This set of data is referred to hereinbelow as a temperature profile.

After the temperature profile has been acquired, temperature sensor module 24 may calculate a core body temperature based on the acquired temperature profile. The method of calculating the core body temperature is described further hereinbelow with reference to FIGS. 8A and 8B.

Multiple temperature-dependent measurements may be taken at each of the two or more body surface locations to provide continuous monitoring, or to improve the accuracy of the calculation, or to allow time for a steady state temperature to be achieved, as described further hereinbelow.

Temperature sensor module 24 may also be configured to transmit data comprising either the temperature profile or the core body temperature, or both, to a remote display, such as a monitor 26. Monitor 26 may be a standard hospital monitor (such as a GE Critikon 400 series monitor) with an input for an industry-standard YSI thermocouple, in which case a signal converter 28 performs the tasks of receiving the module transmission and converting the received data to the industry-standard signal format appropriate for the monitor.

Alternatively, monitor 26 may comprise a general-purpose computer programmed to receive data directly from the temperature sensor module. Monitor 26 may also have a user input device, such as a keyboard 30, by which means a medical attendant may control the display of information on the monitor as well as the communication of data and instructions between the temperature sensor module and the monitor.

Temperature sensor module 24 may also transmit data to a local receiver 32, which may display the core temperature or which may in turn transmit the data to monitor 26.

In a typical configuration, all transmissions described above are performed in a wireless manner, using a wireless protocol such as Bluetooth™. Alternatively, data transmission between some or all of the devices described above may be wire-based. Power for the temperature sensor module is typically provided by internal batteries, but may also be provided by wired or wireless means known in the art.

It is to be understood that when temperature sensor module 24 is configured to operate with one or more other devices, such as local receiver 32 and monitor 26, some or all of the processing functions of the temperature sensor module may be performed by the other devices. These functions include storing the temperature profile, calculating a core body temperature, and displaying the core body temperature and other data.

Figure 2A:
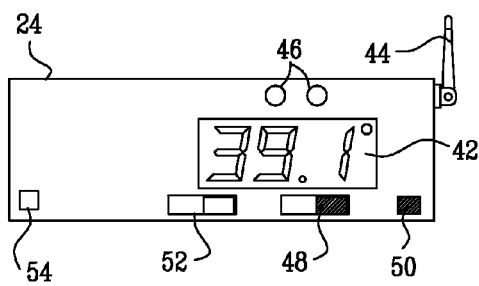
FIGS. 2A and 2B are schematic views of respective top and bottom sides of a temperature sensor module configured to determine a core body temperature, in accordance with an embodiment of the present invention.
Figure 2B:
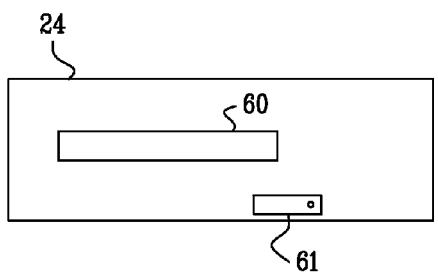

FIGS. 2A and 2B are schematic views of respective top and bottom sides of temperature sensor module 24, in accordance with an embodiment of the present invention. As indicated in FIG. 2A, temperature sensor module 24 may have a display screen 42 for displaying the calculated core body temperature and other relevant data. Additionally or alternatively, the temperature sensor module may have means for remote communications, such as an antenna 44. Antenna 44 may have a pole configuration as indicated in FIG. 2A and may be positioned at any angle (from 0 to 90°) relative to the surface of module 24. Alternatively, the antenna may have other configurations, such as having the form of a coil embedded within a portion of the temperature sensor module, or printed on a printed circuit board. The module may also have user input means, such as one or more mode buttons 46, for controlling modes of operation. A power switch 48 may be used to turn on the temperature sensor module to begin temperature acquisition and calculation. An ambient temperature sensor 50 may also be included in the temperature sensor module, in order that the temperature profile may include a parameter based on ambient temperature.

A battery compartment 52 may be included to contain a battery for powering the temperature sensor module. As noted above, the temperature sensor module may also be configuring to receive external power. A sound generator 54, such as an acoustic piezoelectric transducer, may also be included to provide various audio alerts. For example, an alert may be sounded when a stable temperature value has been determined. An alert may also provide a warning alarm if, for example, core body temperature begins to change quickly or exceeds the limits of a pre-determined range. Alternatively or additionally, local receiver 32 or monitor 26 may issue such alarms.

FIG. 2B shows the underside of the temperature sensor module, i.e., the side that is affixed or pointed towards the body surface. The underside has a temperature sensor array 60, which is described further hereinbelow with respect to FIGS. 5A-5C. The underside may also have a position sensor 61, using a LED or other means of position tracking known in the art, such as a tracking ball or gyroscope. A position tracking element is included in the handheld embodiment of the module, described further below with respect to FIG. 6.

Figure 3A:
FIGS. 3A and 3B are schematic side views of alternative configurations of the underside of a temperature sensor module, in accordance with embodiments of the present invention.
Figure 3B:
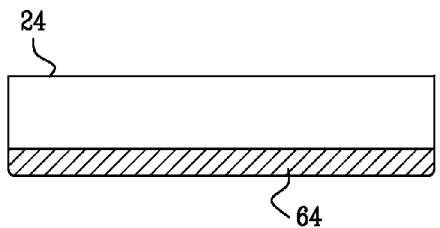

FIGS. 3A and 3B are schematic side views of alternative configurations of temperature sensor module 24, in accordance with embodiments of the present invention. In FIG. 3A, spacers 62 are shown protruding from the underside of the module. These spacers maintain a distance, typically 1-2 mm, between the body surface and the underside of the temperature sensor module, thereby maintaining a distance between the body surface and contactless temperature sensors, such as temperature sensors that employ infrared (IR) technology, as described below with reference to FIG. 4B. In FIG. 3B, the underside of temperature sensor module 24 is shown as having a thin adhesive coating 64, which facilitates affixing the module to the body surface as a temperature patch (as shown in the configuration of FIG. 1).

FIGS. 4A-4C are schematic, pictorial illustrations of alternative configurations of temperature sensors comprised in temperature sensor array 60, in accordance with an embodiment of the present invention. The sensors can be designed based on any of several temperature sensing technologies known in the art. FIGS. 4A-4C show configurations of temperature sensors based on three different technologies.

FIG. 4A shows a thermal conductive sensor configuration 70, in which a sensor 72, such as a thermocouple pad or a printed (photo-etched) temperature sensor or a thermistor, is in thermal contact with a surface 74 so as to acquire temperature dependent measurements of the surface. Because the sensor is initially at a different temperature from the surface temperature, there is a transient period during which the temperature of sensor stabilizes to reach the temperature of the surface. Typically, sensor 72 is insulated with insulation 76 to isolate the sensor from the ambient temperature.

FIG. 4B shows a radiation sensor configuration 80, in which a radiation sensor 81, such as an infrared (IR) sensor, is held near surface 74 in order to provide a temperature-dependent measurement of the surface. A lens 82 may be placed in front of the IR sensor to focus infrared radiation from the body surface onto the sensor. Because there is no conduction of heat, there is no transient period during measurement. The surface temperature is therefore determined essentially instantaneously.

FIG. 4C shows a heat flux sensor configuration 90, in which two stacked sensors, including a base sensor 92 and a secondary sensor 94, are separated by a heat flux insulation layer 96. A heat flux sensor can be employed to obtain an accelerated calculation of a core body temperature, as described further in the above-mentioned U.S. Pat. No. 6,280,397 ('397) to Yarden et al. Additionally or alternatively, the stacked sensor configuration of FIG. 4C can be used to enhance the accuracy of steady-state temperature measurements based on the algorithm described below in the Appendix.

Figure 5A:
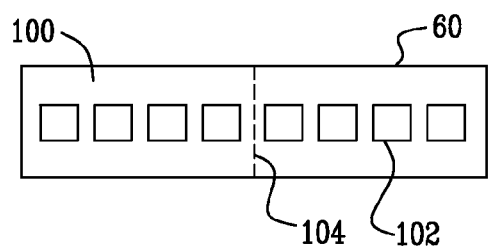
FIGS. 5A-5C are schematic, pictorial illustrations of alternative temperature sensor arrays, in accordance with embodiments of the present invention.
Figure 5B:
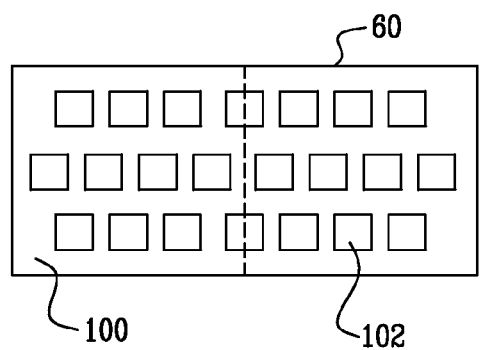
Figure 5C:
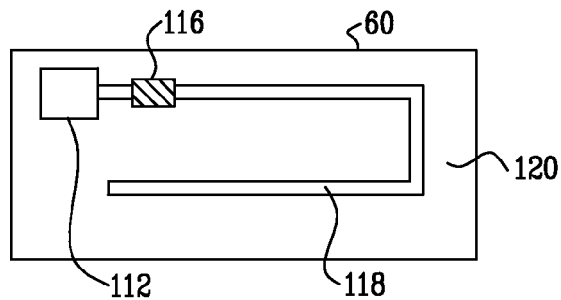

FIGS. 5A-5C are schematic, pictorial illustrations of configurations of temperature sensor array 60, in accordance with embodiments of the present invention. In FIG. 5A, temperature sensor array 60 comprises a printed circuit board (PCB) 100, on which are mounted multiple temperature sensors indicated as pads 102. Pads 102 may be heat-conducting thermocouples, infrared sensors, or heat flux sensors, as described above with respect to FIGS. 4A-4C, or other temperature-sensitive elements known in the art.

In typical configurations, PCB 100 has a width of 15 to 30 mm, and length of 20 to 50 mm. Typical spacing between the pads, measured from the center of one pad to the center of the next closest pad, is 3 to 7 mm. Pad dimensions are typically 1 mm by 0.5 mm. Spacing between pads may also be asymmetrical with respect to a center line 104. For example, pads to one side of the center line may have spacing of 5 mm, in contrast with a 7 mm spacing on the other side of the center. This sort of asymmetry gives better variability in the input to the algorithm described in Appendix A.

PCB 100 may also be used as a spacing insulation between two rows of sensors on opposite sides of the PCB for purposes of heat flux measurement. The typical width of the PCB for this purpose is 0.2-0.5 mm.

All of the above dimensions and configurations, however, are presented solely by way of example, and the principles of the present invention may likewise be implemented using other dimensions and configurations.

Wiring on PCB 100 (indicated schematically in FIG. 7) conducts signals corresponding to temperature readings from each of pads 102 to a processor, which is described further hereinbelow with reference to FIG. 7. In an alternative, integrated configuration, pads 102 may be comprised in an integrated circuit, such as a focal point array (FPA) of IR sensors. In the integrated configuration, each pad corresponds to a pixel, which is capable of providing a distinct temperature reading.

Pads 102 in FIG. 5A are mounted in a single row across PCB 100. Pads 102 may alternatively be arranged in an array of two or more rows, as shown in FIG. 5B, with at least two pads in each row.

FIG. 5C is a schematic, pictorial illustration of a further alternative configuration of temperature sensor array 60. A movement mechanism, such as an actuator 116, drives one temperature sensor pad 112 along a track 118 that is mounted or embedded on a PCB 120. Typically, pad 112 is configured as a radiation sensor such as the IR sensor 82 described hereinabove (FIG. 4B). Actuator 116 may be any appropriate actuator known in the art, such as a stepping motor or linear coil ("voice coil") actuator. The pattern of track 118 is a route that may be linear or back-and-forth, or may have other shapes, designed so that the temperature sensor may measure temperatures on the body surface at locations proximate to a blood vessel, similar to the multiple locations measured using the stationary configurations of the temperature sensor array (FIGS. 5A and 5B). As the pad moves along the track, it takes temperature measurements at predetermined positions, typically at intervals between 2 and 7 mm.

Figure 6:
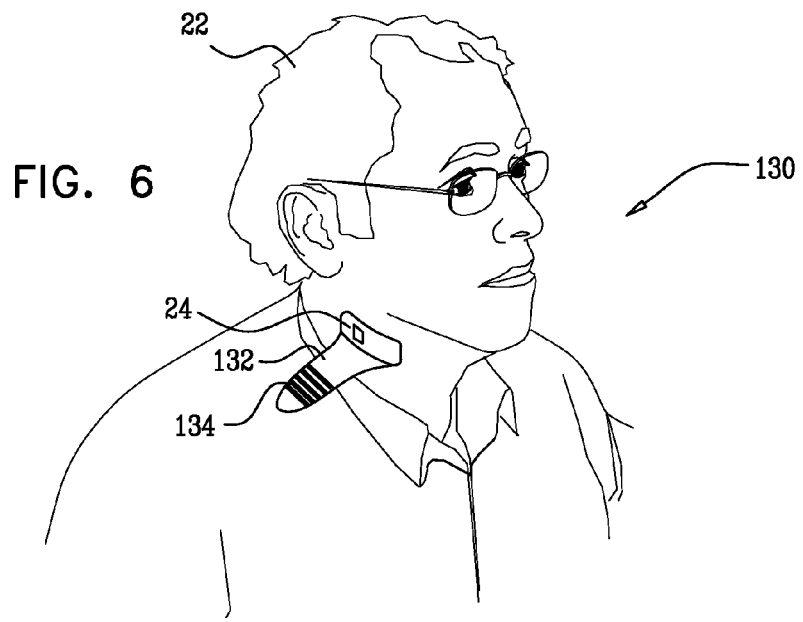
FIG. 6 is a schematic, pictorial illustration of a handheld thermometer, in accordance with an embodiment of the present invention.

FIG. 6 is a schematic, pictorial illustration of an alternative system 130 for making a non-invasive core body temperature measurement with a handheld thermometer 132, in accordance with an embodiment of the present invention. Handheld thermometer 132 comprises temperature sensor module 24 and a case 134, which may be gripped and held against or near a body surface, rather than being affixed or bound. Typically, temperature sensors in the handheld thermometer are IR sensors, thereby allowing an instantaneous acquisition of a temperature profile when the handheld thermometer is brought close or in contact with the measurement site.

Alternatively, the handheld thermometer may include a position sensing mechanism, such as sensor 61, comprising a LED with a detector and aperture wheel, as noted hereinabove (FIG. 2B). An attendant may then measure the temperature of the subject by moving the handheld thermometer across the measurement site. Acquisition of the temperature profile is performed in a manner similar to that performed by the temperature sensor array having a movement mechanism, described above with reference to the configuration of FIG. 5C.

Figure 7:
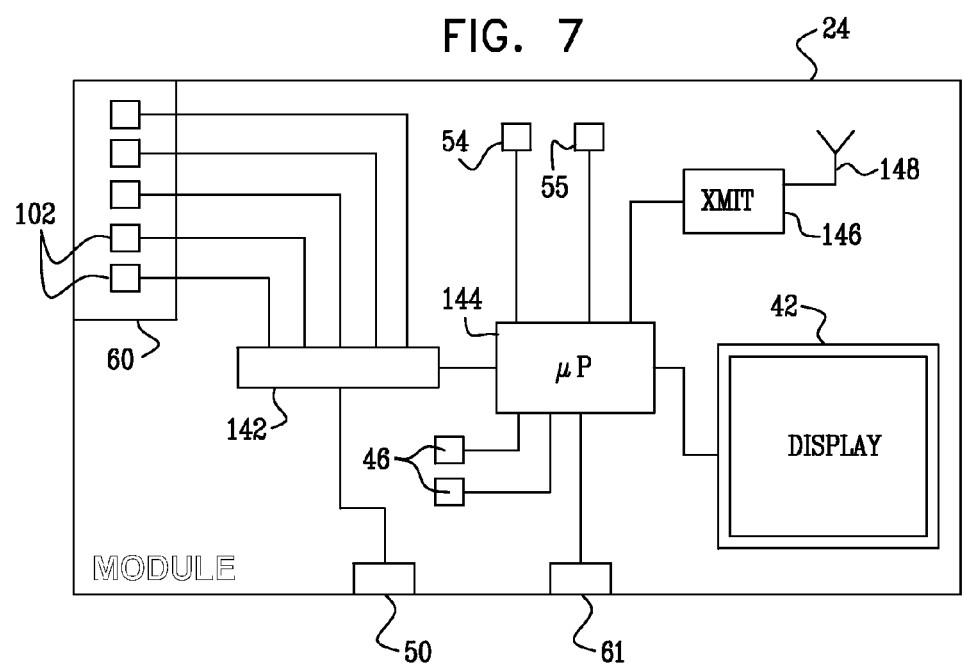
FIG. 7 is a schematic block diagram of a temperature sensor module, in accordance with an embodiment of the present invention.

FIG. 7 is a schematic, block diagram of temperature sensor module 24, in accordance with an embodiment of the present invention. The temperature sensor module includes temperature sensor array 60, on which are mounted temperature sensors 102 (FIGS. 5A-5C). A multiplexer 142 receives signals generated by sensors 102 and by ambient temperature sensor 50, and transmits these signals to a processor 144. Processor 144 typically has non-volatile memory to store a software program as well as the temperature profile. Processor 144 also receives inputs from mode buttons 46 and from position sensor 61.

The processor builds the temperature profile from the data received from the temperature sensors, as well as from the position sensor if the temperature is taken while the temperature sensor module is moved. From the temperature profile, processor 144 may calculate a core body temperature, applying calculation methods described in more detail below with reference to FIG. 8. Alternatively, the processor may simply collect and transmit digitized or even analog temperature and calibration data, for processing by another component, such as local receiver 32 or monitor 26. The processor may send data including the core body temperature and/or the temperature profile to a transmitter 146, so as to send the data over an antenna 148 to a remote receiver, such as monitor 26, or it may transmit the data to a wired output 55. The processor may also display the data including the core body temperature on display 42.

Temperature sensor module 24, when configured as an affixed patch thermometer, may operate in a continuous mode, whereby processor 144 repeatedly reiterates the process of acquiring temperature profiles, calculating new values for the core body temperature, and displaying the new values. Alternatively, the temperature sensor module may operate in a non-continuous mode, whereby a single, fixed temperature is displayed after processing unit 30 completes an initial calculation. The non-continuous mode is more typical for the handheld configuration. In this mode, processor 144 may also provide a notification sound by sending a signal to sound generator 54, in order to indicate that the calculation is complete.

Figure 8:
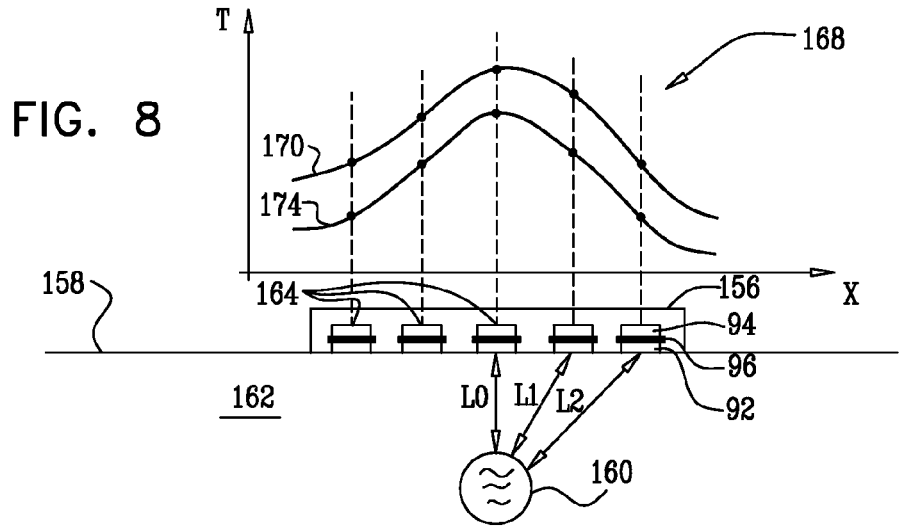
FIG. 8 is a schematic side view of a temperature sensor array on or near a body surface, above a blood vessel, with a graphical representation of a temperature profile acquired by the temperature sensor array, in accordance with an embodiment of the present invention.

FIG. 8 is a schematic side view of a temperature sensor array 156 placed on or near a body surface 158 and approximately centered above a blood vessel 160, in accordance with an embodiment of the present invention. The blood vessel may be, for example, a carotid artery as shown in FIG. 1, or any other suitable artery that is located near the skin surface, such as the temporal artery. Blood vessel 160 is assumed to be at the core body temperature, referred to hereinbelow as $T_b$. Also shown in FIG. 8 is a graph 168 of temperature profiles acquired by the temperature sensor array.

Temperature sensor array 156 comprises a row of temperature sensors 164, which are arranged in a manner similar to the linear temperature sensor array described above with reference to FIG. 5A. Sensors 164 may utilize any temperature sensing technology known in the art, such as those described above. In accordance with one embodiment, temperature sensors 164 are heat flux sensors, based on heat flux sensor configuration 90 as described above with reference to FIG. 4C. Each heat flux sensor comprises base sensor 92 and secondary sensor 94, separated by heat flux insulation layer 96.

Tissue 162 conducts heat from the blood vessel to the body surface. Base sensors 92 of each of the heat flux sensors measure surface temperatures. The highest measured temperature is the temperature directly above the blood vessel. A temperature plot 170 is a representation of temperature readings made by base sensors 92 at a given point in time. The x-axis of graph 168 represents linear distance along the length of array 156. The y-axis represents temperatures measured by the sensors along the length of the array. A temperature plot 174 is similarly a representation of temperature readings made by secondary sensors 94 at the given point in time. For a two-dimensional temperature profile acquired either by a two-dimensional array of sensor pads, such as that shown in FIG. 5B, or by a two-dimensional scan over the body surface, either mechanical (FIG. 5C) or manual (FIG. 6), the resulting plot of measured coordinates vs. temperatures would be three-dimensional.

As indicated by the plots, the highest temperature reading is at the location on array 156 that is directly above the blood vessel. Successive sensors that are increasingly more distant from this maximum temperature location are at respectively greater distances from the blood vessel. At greater distances, the heat resistance between the blood vessel and the sensors increases, and the temperatures are therefore successively lower.

The temperature profiles shown in plots 170 and 174 may be used to calculate the core body temperature, as described further hereinbelow. Alternatively or additionally, the data from both plots together may provide input to the algorithm for calculating the core body temperature that is described in the Appendix.

In an embodiment of the present invention, a set of simultaneous heat flux equations are generated corresponding to the flow of heat from the blood vessel, through the heat resistance of the body tissue, to a set of body surface locations. The locations are measured relative to the location of maximum temperature, i.e., the point directly above the blood vessel. The maximum temperature location may either be a location sensed directly by a temperature sensor or a location interpolated from the temperature data.

The unknown variables in all of the equations are the core body temperature, $T_b$, the coefficient of heat conductance of the tissue, $K_h$, and the distance between the maximum temperature location on the body surface and the blood vessel (designated in the Appendix as $L_t$). Solving three simultaneous heat flux equations provide a solution for the unknowns so as to obtain the core body temperature. In practice, more simultaneous equations are generated, and the unknown values are determined by error minimization techniques, such as a least squared error method.

In a further embodiment, additional equations for solving for the core body temperature are generated based on the heat flux between each base sensor 92 and its respective secondary sensor 94, as this heat flux may be equated to the heat flux reaching each base sensor. Using this method, the unknown variables described above can be solved when temperature measurements are made at a minimum of two locations on the body surface. An example for calculating core body temperature from equations that include these secondary heat flux equations is provided in the Appendix. In a further embodiment based on heat flux beyond the body tissue, the set of simultaneous equations may include an equation for the heat flux between conductive sensors on the body surface (FIG. 4A) and the ambient temperature (as measured by ambient temperature sensor 50, described hereinabove).

In a still further embodiment, heat flux equations for solving for the unknown variables are generated by taking two temperature readings at two body surface locations and by interpolating additional temperature values at one or more intermediate locations, based on the gradient of the temperature difference between two measured points. A heat flux relationship between the blood vessel and the body surface points (comprising the two measured points and additional interpolated points) thus provides additional simultaneous equations needed to solve for the unknown values (i.e., the core body temperature, $T_b$, the coefficient of heat conductance of the tissue, $K_b$, and the distance between the maximum temperature location on the body surface and the blood vessel.)

Alternatively, assuming linear relations between the heat fluxes at different points along the skin surface (above a blood vessel), it is possible to calculate the unknown values using the temperature readings only, without measuring the fluxes. The linear relation can be determined statistically or as an empirical function of the temperature readings.

Although the embodiments described above relate specifically to calculation of a core body temperature based on body surface temperature readings, the principles of the present invention may also be applied to calculating the core body temperature from a profile of other temperature-dependent measurements, such as body surface heat flux measurements found in transient mode, using the methods described the above-mentioned U.S. Pat. No. 6,280,397 ('397) to Yarden et al. The principles of the present invention may also be applied to continuous temperature monitoring.

Furthermore, although the embodiments described above relate specifically to measuring body temperature, the principles of the present invention may also be applied in measuring sub-surface temperatures in non-medical applications, such as the measurement of fluid temperatures within pipes in walls or under floors or soil.

Figure 9:
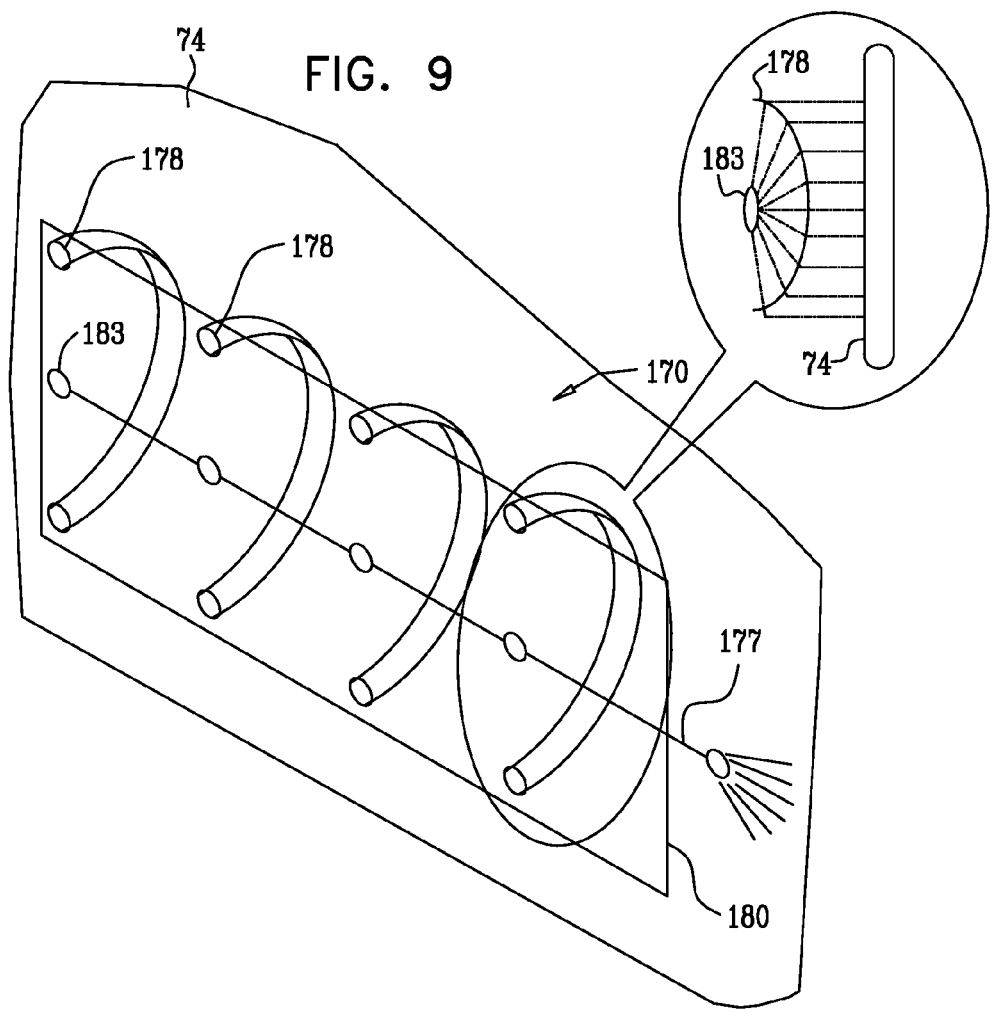
FIG. 9 is a schematic, pictorial illustration of temperature sensor units with tubular lenses, in accordance with embodiments of the present invention.

FIG. 9 is a schematic, pictorial illustration of a temperature sensor unit 170, in accordance with an alternative embodiment of the present invention. Unit 170 comprises a flexible PCB 180, which provides a similar body surface temperature profile to that provided by PCB 100. Temperature sensor pads 183 are mounted in a single row across PCB 140. Each pad 183 is an infrared sensor (similar to sensor 81 in FIG. 4B), which is connected by one of a set of wires in wiring 177 to a processing unit.

A respective tubular lens 178 (which may have the form of lens 82 in FIG. 4B) focuses infrared radiation from the body surface onto each pad 183. As indicated in the figure, each tubular lens 178 has a tube shape that curves so as to partially encircle the corresponding pad 183. Each tubular lens thus focuses infrared radiation from a linear section of surface 74 onto the corresponding pad. The radiation measured by each pad therefore corresponds to an average temperature over the linear section of the skin. The sensor unit of FIG. 9 may be placed in contact with the skin, or it may alternatively be held at a certain distance from the skin during temperature measurement.

It will thus be appreciated that embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

Given the sensor array configuration of FIG. 8, we set the heat flux from the blood vessel to a given base sensor to equal the heat flux from the given base sensor to the respective secondary sensor:

$$K_b \cdot \frac{(T_b - T_{S_i})}{L_i} = K_a \cdot \frac{(T_{S_i} - T_{R_i})}{X_a}$$

Here the $L_i$ values are distances from the blood vessel outer wall to the skin surface at point i, and $X_i$ is the distance from the maximum temperature point on the skin surface, which is designated $X_0$. $L_i$ is a function of $L_0$ (depth of the blood vessel, i.e., distance from the vessel wall to the maximum temperature point on the skin), of r (the blood vessel radius), and of $X_i$. The other terms in the above equation include:

$K_b$—body tissue heat transfer coefficient.
$K_a$—heat transfer coefficient of insulation layer 96.
$X_a$—thickness of insulation layer 96.
$T_b$—Temperature of the blood in the vessel.
$T_{Si}$—Temperature at body surface.
$T_{Ri}$—Temperature of secondary sensor.

The above equation may be simplified to give:

$$\frac{(T_b - T_{S_i})}{L_i} = \frac{K}{X_a}(T_{S_i} - T_{R_i})$$

Now, substituting $$\frac{K}{X_s} = \alpha$$

and $$L_i = \sqrt{X_i^2 + X_0^2} - r \sim a \cdot X_0 + b$$

gives:

$$\frac{(T_b - T_{Si})}{a_i X_0 + b_i} = \alpha(T_{Si} - T_{Ri})$$

or alternatively:

$$T_b - T_{Si} = a_i X_0 \alpha (T_{Si} - T_{Ri}) + b_i \alpha (T_{Si} - T_{Ri}).$$

Subtracting $T_b$ from both sides of the equation gives:

$$y_i \equiv T_{Si} = \underbrace{X_0 a}_{\beta_1} \cdot \underbrace{[a_i(T_{Ri} - T_{Si})]}_{x_{i1}} + \underbrace{\alpha}_{\beta_2} \cdot \underbrace{[b_i(T_{Ri} - T_{Si})]}_{x_{i2}} + \underbrace{T_b}_{\beta_0}$$

The above equation can be expressed in vector form as:

$$y_i = \beta_1[X_{i1}] + \beta_2[X_{i2}] + \beta_0$$

or:

$$\begin{bmatrix} T_{S1} \\ T_{S2} \\ T_{S3} \\ \vdots \\ T_{Sn} \end{bmatrix} = \begin{bmatrix} a_1 \cdot (T_{R1} - T_{S1}) & b_1 \cdot (T_{R1} - T_{S1}) & 1 \\ a_2 \cdot (T_{R2} - T_{S2}) & b_2 \cdot (T_{R2} - T_{S2}) & 1 \\ a_3 \cdot (T_{R3} - T_{S3}) & b_3 \cdot (T_{R3} - T_{S3}) & 1 \\ \vdots & \vdots & \vdots \\ a_n \cdot (T_{Rn} - T_{Sn}) & b_n \cdot (T_{Rn} - T_{Sn}) & 1 \end{bmatrix} \cdot \begin{bmatrix} \beta_1 \\ \beta_2 \\ \beta_0 \end{bmatrix}$$

A linear regression analysis is then applied to find the vector $\beta = <\beta_1, \beta_2, \beta_0>$ that will minimize the error in the above equation and thus give an accurate reading of $T_b = \beta_0$. The vector $\beta$ may be calculated using the formalism:

$$\vec{\beta} = (\overline{X} \cdot \overline{X})^{-1}(\overline{X} \cdot \vec{y})$$

The invention claimed is:

1. Thermometric apparatus, comprising:
one or more temperature sensors, which are configured to provide respective temperature-dependent readings at two or more locations, separated by a distance, on a surface of a living body in a vicinity of a sub-surface heat source within the body; and
a processing unit configured to process the readings from the two or more locations together with information relating to the distance between the locations so as to determine a temperature of the sub-surface heat source.

2. The apparatus of claim 1, wherein the sub-surface heat source is blood vessel, and wherein the processing unit is configured to determine the temperature of the blood in the vessel.

3. The apparatus of claim 2, wherein the two or more locations are arranged along a line that crosses the vessel.

4. The apparatus of claim 2, wherein the vessel is a carotid artery, and wherein the one or more temperature sensors are configured to measure the temperature-dependent readings on a neck of the subject.

5. The apparatus of claim 1, wherein the processing unit is configured to determine from the readings a temperature gradient over the surface and to use the temperature gradient in determining the temperature of the sub-surface heat source.

6. The apparatus of claim 1, wherein the processing unit is configured to use a set of heat flux relationships in determining the temperature of the sub-surface heat source.

7. The apparatus of claim 1, wherein the processing unit is configured to determine from the readings a coordinate of maximum temperature on the surface and to use the coordinate in determining the temperature of the sub-surface heat source.

8. The apparatus of claim 1, and comprising a patch, which holds the one or more temperature sensors and is configured to be affixed to a body surface.

9. The apparatus of claim 1, and comprising a movement mechanism for moving a sensing area of the one or more temperature sensors between the two or more locations.

10. The apparatus of claim 1, and comprising:
a housing, which contains the one or more temperature sensors and is configured to be moved in proximity to the surface between the two or more locations; and
a position sensor for tracking movement of the housing.

11. The apparatus of claim 1, wherein the one or more temperature sensors comprise infrared sensors.

12. The apparatus of claim 11, and comprising at least one lens, for focusing infrared radiation from the surface onto the one or more temperature sensors.

13. The apparatus of claim 1, wherein the one or more temperature sensors comprise an array of multiple temperature sensors, which are arranged such that each of the temperature sensors is disposed in proximity to a respective one of the locations.

14. The apparatus of claim 1, and comprising an ambient temperature sensor, which is configured to measure an ambient temperature, and wherein the processing unit is configured to use the ambient temperature in determining the temperature of the sub-surface heat source.

15. The apparatus of claim 1, and comprising a transmitter configured to transmit a signal indicative of the temperature of the sub-surface heat source to an external monitor.

16. The apparatus of claim 1, and comprising a signal converter, which is configured to receive an input signal indicative of the temperature of the sub-surface heat source and to convert the input signal into an output signal having a format complying with an industry monitoring standard.

17. A method for thermometric measurement, comprising:
measuring respective temperature-dependent readings at two or more locations, separated by a distance, on a surface of a living body in a vicinity of a sub-surface heat source within the body; and
calculating a temperature of the sub-surface heat source from the temperature-dependent readings at the two or more locations together with information relating to the distance between the locations.

18. The method of claim 17, wherein the two or more locations are arranged along a line that crosses the sub-surface heat source.

19. The method of claim 17, wherein the sub-surface heat source is a blood vessel, and wherein calculating the temperature comprises determining the temperature of the blood in the vessel.

20. The method of claim 19, wherein the blood vessel is the carotid artery, and wherein the two or more locations are disposed on a neck of the subject.

21. The method of claim 17, wherein calculating the temperature comprises determining from the temperature-dependent readings intermediate data comprising one or more of a temperature gradient, a set of heat flux relationships, and a coordinate of maximum temperature, and using the intermediate data in calculating the temperature of the sub-surface heat source.

22. The method of claim 17, wherein measuring the respective temperature-dependent readings comprises moving a sensing area of one or more temperature sensors between the two or more locations.

23. The method of claim 17, wherein measuring the respective temperature-dependent readings comprises focusing infrared radiation from the surface onto one or more infrared sensors.

24. The method of claim 17, wherein measuring the respective temperature-dependent readings comprises applying an array of multiple temperature sensors to the surface so that each of the temperature sensors is disposed in proximity to a respective one of the locations.

* * * * *